United States Patent
Kim et al.

(10) Patent No.: US 7,581,122 B2
(45) Date of Patent: *Aug. 25, 2009

(54) POWER SUPPLY INTEGRATED CIRCUIT WITH FEEDBACK CONTROL

(75) Inventors: Neil Y. Kim, Laguna Niguel, CA (US); Pieter Vorenkamp, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/158,141

(22) Filed: Jun. 21, 2005

(65) Prior Publication Data

US 2005/0285575 A1 Dec. 29, 2005

Related U.S. Application Data

(60) Provisional application No. 60/584,088, filed on Jun. 29, 2004.

(51) Int. Cl.
*H02J 1/00* (2006.01)
(52) U.S. Cl. .................. 713/300; 713/310; 713/320; 713/321; 713/322; 713/323; 713/324; 713/330; 713/340
(58) Field of Classification Search ............. 713/300, 713/310, 320–324, 330, 340
See application file for complete search history.

(56) References Cited

U.S. PATENT DOCUMENTS 7,000,125 B2 * 2/2006 Chapuis et al. ............. 713/300
2004/0123164 A1 6/2004 Chapuis et al.

OTHER PUBLICATIONS

Anonymous, "Integrated Voltage Regulator foe an On-Card +1.7 Volt Power Supply", IBM Technical Disclosure Bulletin, IBM Corp., New York, USA, vol. 31 No. 2, Jul. 1, 1988, pp. 22-23, XP002344799 ISSN: 0018-8689.

* cited by examiner

*Primary Examiner*—Abdelmoniem Elamin
(74) *Attorney, Agent, or Firm*—McAndrews, Held & Malloy, Ltd.

(57) ABSTRACT

A system and method for providing power control in a power management integrated circuit. A power management integrated circuit may comprise a communication interface module that receives power supply information from at least one electrical device external to the power management integrated circuit. The power supply information may, for example, comprise information related to a first electrical power. The power management integrated circuit may also comprise a power regulator module that determines a regulated power signal based, at least in part, on a portion of the power supply information. The regulated power signal may correspond to the first electrical power. For example, the regulated power signal may comprise the first electrical power or cause another circuit to output the first electrical power. The power management integrated circuit may then output the regulated power signal to at least one electrical device external to the power management integrated circuit.

45 Claims, 2 Drawing Sheets

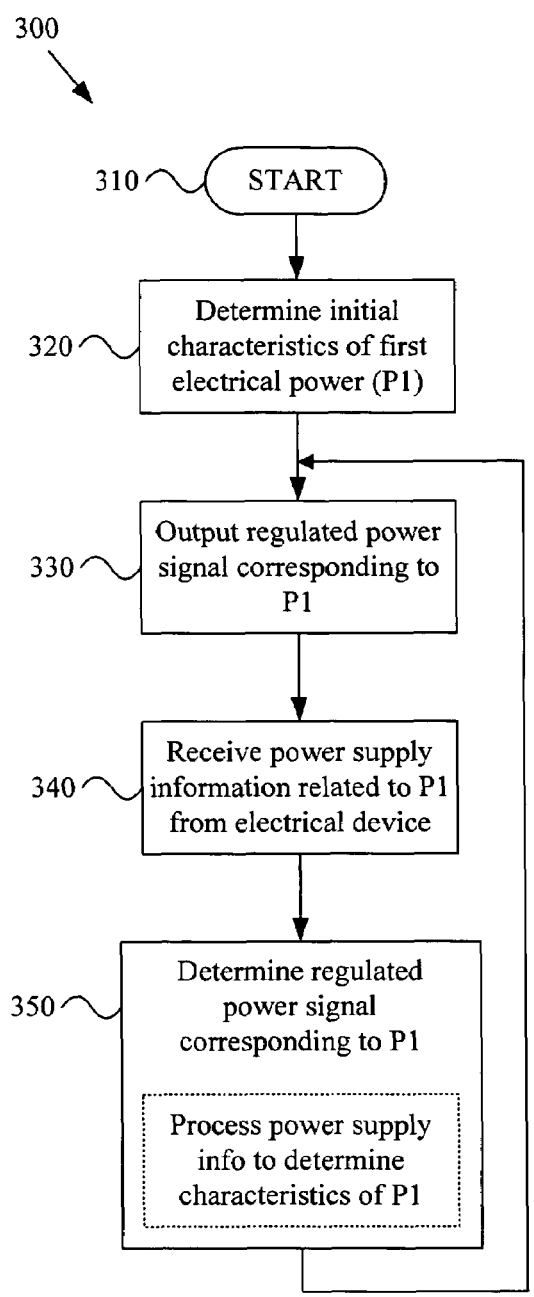
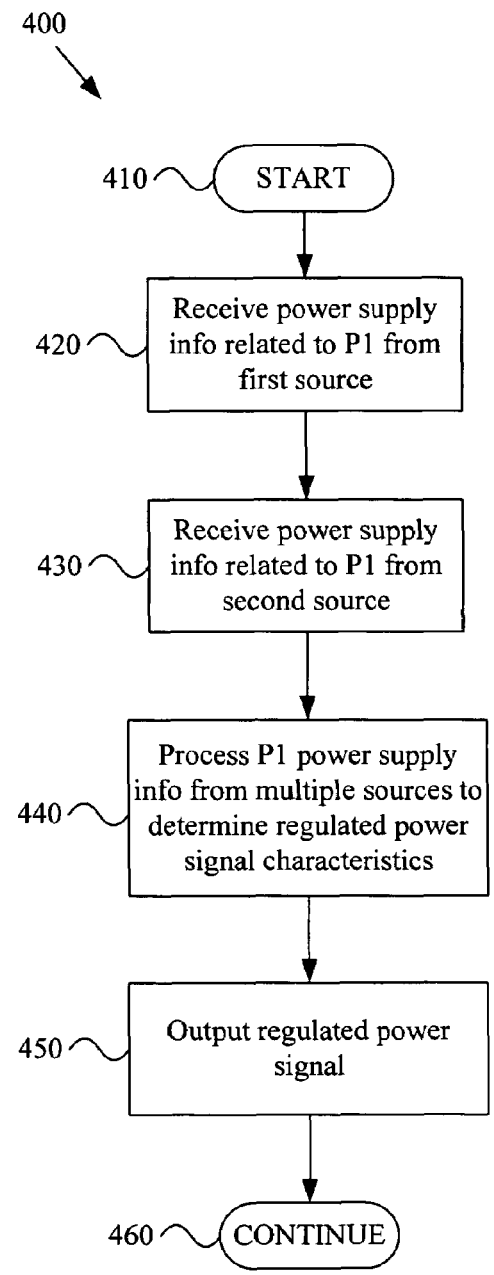
Figure 3
Figure 4

POWER SUPPLY INTEGRATED CIRCUIT WITH FEEDBACK CONTROL

CROSS-REFERENCE TO RELATED APPLICATIONS/INCORPORATION BY REFERENCE

This patent application is related to and claims priority from provisional patent application Ser. No. 60/584,088, filed Jun. 29, 2004, and entitled POWER SUPPLY INTEGRATED CIRCUIT WITH FEEDBACK CONTROL, the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Different electrical circuits and/or devices may be designed to operate using electrical power having a variety of characteristics. Even electrical circuits and/or devices designed to receive electrical power at an identical voltage level may have different power supply needs. For example, some circuits or devices may operate well over a larger voltage range than others. Also for example, some circuits or devices may operate better under noisy conditions than other circuits. Even a particular electrical circuit or device may utilize electrical power differently and have different power needs at various points in time. For example, the amount of electrical energy consumed in a circuit or device may vary in accordance with varying utilization of various circuit components or sub-components.

Characteristics of electrical power supplied to electrical circuits, or components thereof may vary over time. For example, the power supply providing the electrical power may exhibit inconsistent behavior. Further for example, the consumption of energy by one or more circuit components may affect characteristics of electrical power provided to other components. For example an increased utilization of current by a first electrical component may result in a voltage and/or current decrease to a second electrical device.

Because of varying power supply needs (e.g., between circuits and during operation) and varying power supply characteristics, electrical circuits or components thereof are often forced to operate with power supply characteristics that are less than desirable.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing power control in a power management integrated circuit, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 3 illustrates a flow diagram of a method for providing regulated signal(s) corresponding to electrical power(s) from a power management integrated circuit utilizing received power supply information, in accordance with various aspects of the present invention.

FIG. 4 illustrates a flow diagram of a method for providing regulated signal(s) corresponding to electrical power(s) from a power management integrated circuit utilizing power supply information received from a plurality of sources, in accordance with various aspects of the present invention.

DETAILED DESCRIPTION OF THE INVENTION

Figure 1:
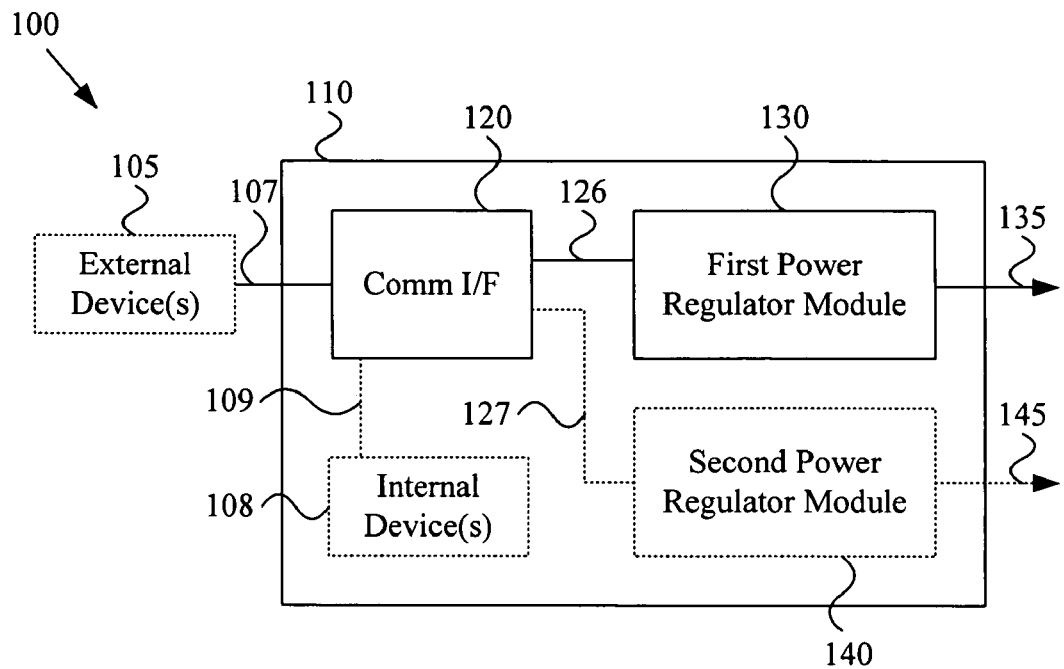
FIG. 1 shows a block diagram of a system comprising an exemplary power management integrated circuit utilizing received power supply information, in accordance with various aspects of the present invention.

FIG. 1 shows a block diagram of a system 100 comprising an exemplary power management integrated circuit 110 utilizing received power supply information, in accordance with various aspects of the present invention. The power management integrated circuit 110 may comprise any of a variety of general integrated circuit characteristics. The power management integrated circuit 110 may also comprise various aspects of known power regulation or generation circuitry. The power management integrated circuit 110 may also comprise various aspects of circuitry that is not related to power regulation or generation. Accordingly, the scope of various aspects of the present invention should not be limited by characteristics of particular integrated circuitry, particular power regulation or generation circuitry, or particular circuitry that is not related to power regulation or generation.

The following discussion may generally refer to one or more "modules" that perform various functions. It should be noted that a "module" may be implemented in hardware, software or a combination thereof. Further, portions of modules may be shared. For example, a first module may share various hardware and/or software components with a second module. Accordingly, the scope of various aspects of the present invention should not be limited by characteristics of a specific implementation of a module or by arbitrary boundaries between modules.

The exemplary power management integrated circuit 110 may comprise a communication interface module 120. The communication interface module 120 may receive power supply information 107 from at least one electrical device 105 external to the integrated circuit 110. Also, for example, the communication interface module 120 may receive power supply information 109 from at least one electrical device 108 internal to the integrated circuit 110. Though the following discussion will generally discuss an exemplary scenario including an electrical device external to the integrated circuit 110, the scope of various aspects of the present invention should by no means be limited by such externality.

Such power supply information 107 may, for example, comprise information related to a first electrical power. Such power supply information 107 may, for example, also comprise information related to a second electrical power and/or nth electrical power.

The external electrical device(s) 105 may, for example, receive and utilize the first electrical power. Alternatively, for example, the external electrical device(s) 105 may communicate power supply information 107 that originates at other electrical devices that utilize the first electrical power. Similarly, in an exemplary scenario involving a second or nth electrical power, the external electrical device(s) 105 may, for example, receive and utilize the second or nth electrical power. Alternatively, in an exemplary scenario, the external electrical device(s) 105 may communicate power supply information 107 that originates at other electrical devices that utilize the second or nth electrical power. Further for example, the external electrical device(s) 105 may comprise one or more devices that monitor power supply characteristics.

The external electrical device(s) 105 may comprise characteristics of any of a large variety of electrical devices. For example and without limitation, the external electrical device(s) 105 may comprise characteristics of analog and/or digital circuitry. The external electrical device(s) 105 may, for example, comprise passive or active components. The external electrical device(s) 105 may, for example, comprise an integrated circuit. Further for example, the external device(s) 105 may comprise characteristics of processing circuitry, communication circuitry, control circuitry, user interface circuitry, etc. Accordingly, the scope of various aspects of the present invention should not be limited by characteristics of particular external electrical devices.

The power supply information 107 received by the communication interface module 120 may comprise characteristics of any of a variety of power supply information. For example and without limitation, the power supply information 107 may comprise information related to power supply voltage level (e.g., voltage level of power received by a device or desired voltage level for power received by a device). Also for example, the power supply information 107 may comprise information of any of a variety of characteristics of electrical power. Such characteristics may, for example and without limitation, comprise voltage variability characteristics (e.g., ripple, noise, stability, switching frequency, etc.), load response characteristics, various current-related power characteristics, energy-efficiency characteristics, etc. Such power supply information 107 may, for example, comprise absolute or relative values. Also, the power supply information 107 may comprise general data communication information (e.g., source and/or destination information). The scope of various aspects of the present invention should not be limited by any particular power characteristics.

The power supply information 107 may, for example, comprise analog and/or digital information. Accordingly, the communication interface module 120 may comprise analog and/or digital communication capability. In an exemplary scenario, the power supply information 107 may comprise power supply information of a single power supply characteristic (e.g., voltage) represented by a voltage level on a single wire. In another exemplary scenario, the power supply information 107 may comprise multiplexed digital information from a plurality of sources and concerning a plurality of power supply characteristics of a plurality of electrical powers. Such multiplexed digital information may, for example, be communicated over any of a variety of digital communication bus types, including various serial or parallel bus architectures.

Thus, the signal processing capability of the communication interface module 120 may vary, depending on circuit architecture. In one exemplary scenario, the communication interface module 120 may comprise no more than a conduit through which power supply information may flow from an external device to a power regulator module or other module of the integrated circuit 110. In another exemplary scenario, the communication interface module 120 may comprise digital signal processing circuitry, which processes received digital power supply information and directs at least a portion of such digital power supply information to an appropriate power regulator module or other module of the integrated circuit 110.

In an exemplary scenario where the communication interface module 120 may comprise digital communication capability, the communication interface module 120 may comprise capability to communicate digital information over various media and utilizing any of a variety of communication protocols. For example, the communication interface module 120 may comprise the capability to communicate power supply information over a conductor or over wireless or optical interfaces. Further for example, the communication interface module 120 may comprise capability to communicate power supply information with external devices utilizing various contention-based (e.g., CSMA, CSMA/CD, ALOHA, etc.) or contention-free (e.g., various token or polling-based) communication protocols. The communication interface module 120 may, for example, comprise capability to communicate power supply information synchronously or asynchronously.

In general, the communication interface module 120 may communicate power supply information utilizing any of a variety of communication media and any of a variety of communication protocols. Accordingly, the scope of various aspects of the present invention should not be limited by characteristics of a particular communication media or protocol.

The exemplary integrated circuit 110 may comprise a first power regulator module 130. The first power regulator module 130 may, for example, receive at least a portion of the power supply information 107 received by the communication interface module 120, and process such power supply information to determine a first regulated power signal 135, where the first regulated power signal 135 is based at least in part on the processed power supply information. The first regulated power signal 135 may correspond to the first electrical power to which the received power supply information 107 is related.

The first regulated power signal 135 may, for example, correspond to the first electrical power in any of a variety of manners, three non-exclusive examples of which are illustrative in FIG. 2, which will be discussed later. For example and without limitation, the first regulated power signal 135 may comprise the first electrical power. In such a scenario, the first power regulator module 130 might generate the first electrical power using only electrical components internal to the integrated circuit 110 or might utilize electrical components (e.g., power supply circuitry) external to the integrated circuit 110. Also for example, the first regulated power signal 135 may comprise a signal that interacts with power supply circuitry external to the integrated circuit 110, which in turn generates the first electrical power.

The first power regulator module 130 may comprise characteristics of any of a variety of power regulator circuits. For example, the first power regulator module 130 may comprise characteristics of at least a front-end portion (if not a whole portion) of a linear voltage regulator, a switching regulator (e.g., a buck converter, boost converter, buck-boost converter, charge pump, etc.), or other types of known or yet to be developed regulator circuits. Accordingly, the scope of various aspects of the present invention should not be limited by characteristics of a particular type of voltage regulator circuit or portion thereof.

In an exemplary scenario, as mentioned above, where the first power regulator module 130 interacts with circuitry external to the integrated circuit 110 to provide the first electrical power, such external circuitry may comprise electrical components in any of a variety of configurations. For example and without limitation, such electrical component configurations may comprise at least portions of a buck converter, boost converter, buck-boost converter, charge pump, or other types of known or yet to be developed power regulator circuits. Accordingly, the scope of various aspects of the present invention should not be limited by characteristics of particular regulator circuit architectures.

As mentioned previously, the first power regulator module 130 may determine a first regulated power signal 135 based at least in part on a portion of the power supply information 107, wherein the first regulated power signal 135 corresponds to the first electrical power. The first power regulator module 130 may make such a determination in any of a variety of manners, depending on the particular operating scenario.

For example and without limitation, the first power regulator module 130 may determine one or more characteristics of the first electrical power based, at least in part, on a portion of the power supply information 107. The first power regulator module 130 may then determine the first regulated power signal 135 based on the determined characteristic(s).

In a non-limiting exemplary scenario, the power supply information 107 (e.g., as received by the communication interface module 120) may comprise information of a desired voltage level for the first electrical power. The first power regulator module 130 may receive information of the desired voltage level from the communication interface module 120 and determine the first regulated power signal 135 based on such information. For example, the first power regulator module 130 may output a first regulated power signal 135 that comprises the first electrical power characterized by the desired voltage level (or other voltage level based on the desired voltage level). Also for example, the first power regulator module 130 may output the first regulated power signal 135 that, when interacting with circuitry external to the integrated circuit 110, causes the external circuitry to output the first electrical power characterized by the desired voltage level.

In another non-limiting exemplary scenario, the power supply information 107 may comprise information of maximum desired voltage variability. The first power regulator module 130 may receive information of the maximum desired voltage variability from the communication interface module 120 and determine the first regulated power signal 135 based on such information. For example, the first power regulator module 130 may directly output a first regulated power signal 135 that comprises the first electrical power characterized by the maximum desired voltage variability (or voltage variability based on the maximum desired voltage variability). Also for example, the first power regulator module 130 may output the first regulated power signal 135 that, when interacting with circuitry external to the integrated circuit 110, causes the external circuitry to output the first electrical power characterized by the maximum desired voltage variability.

In yet another non-limiting exemplary scenario, the power supply information 107 may comprise information of a minimum energy-efficiency level. The first power regulator module 130 may receive information of the minimum energy-efficiency level from the communication interface module 120 and determine the first regulated power signal 135 based on such information. For example, the first power regulator module 130 may directly output a first regulated power signal 135 that comprises the first electrical power characterized by the minimum energy-efficiency level (or energy-efficiency level based on the minimum energy-efficiency level). Also for example, the first power regulator module 130 may output the first regulated power signal 135 that, when interacting with circuitry external to the integrated circuit 110, causes the external circuitry to output the first electrical power characterized by the minimum energy-efficiency level.

In general, the first power regulator module 130 may determine a first regulated power signal 135 based at least in part on a portion of the power supply information 107, wherein the first regulated power signal 135 corresponds to the first electrical power. Accordingly, the scope of various aspects of the present invention should not be limited by characteristics of any particular type of power supply information or a particular manner of determining a regulated power signal based on such information.

The first power regulator module 130 may, for example, process power supply information that is received (e.g., through the communication interface module 120) from a plurality of electrical devices external to the integrated circuit 110. The first power regulator module 130 may, in various scenarios, process such power supply information to arbitrate between power supply needs of the plurality of electrical devices.

Such arbitration may, for example and without limitation, comprise determining characteristics of the first electrical power (and thus, the corresponding first regulated power signal 135) based, at least in part, on respective priority of the plurality of electrical devices. For example, the first power regulator module 130 may determine characteristics of the first electrical power based solely on the electrical device with the highest priority. Alternatively for example, the first power regulator module 130 may determine characteristics of the first electrical power based on a priority-based weighted average of power supply needs of the electrical devices. Further for example, the first power regulator module 130 may determine characteristics of the first electrical power by averaging respective power supply needs of the electrical devices.

In general, the first power regulator module 130 may, in determining characteristics of the first electrical power (and thus, the corresponding first regulated power signal 135), may arbitrate between needs of a plurality of electrical devices. Accordingly, the scope of various aspects of the present invention should not be limited by characteristics of any particular manner of performing such arbitration.

After determining characteristics of the first regulated power signal 135, the first power regulator module 130 may generate and output the first regulated power signal 135 to at least one electrical device external to the power management integrated circuit 110. The external electrical device may comprise characteristics of any of a variety of electrical devices.

For example and without limitation, the first power regulator module 130 may output the first regulated power signal 135 to power supply circuitry. The first regulated power signal 135 may, for example, cause such power supply circuitry to output the first electrical power having desired characteristics. Such power supply circuitry will be discussed in more detailed in the discussion of FIG. 2. The power supply circuitry may then, for example, output the first electrical power to one or more electrical devices, some of which may provide power supply information 107 to the integrated circuit 110 through the communication interface module 120.

Also for example, the first power regulator module 130 may output the first regulated power signal 135 directly to an external electrical device that, in turn, transmits power supply information 107 to the integrated circuit 110. In an exemplary scenario, the first power regulator module 130 may output the first regulated power signal 135 (e.g., comprising the first electrical power) to a first electrical device external to the integrated circuit 110. The exemplary first electrical device may, in turn, communicate power supply information 107 (e.g., information of desired and/or received voltage or variance level of the first electrical power) to the integrated circuit 110 (e.g., through the communication interface module 120).

The exemplary power management integrated circuit 110 may also, for example, comprise a second power regulator module 140. The second power regulator module 140 may, for example and without limitation, share various characteristics with the exemplary first power regulator module 130 discussed previously. For example, the second power regulator module 140 may determine a second regulated power signal 145 based at least in part on a portion of the power supply information 107 (e.g., as received by the communication interface module 120), wherein the second regulated power signal 145 corresponds to second electrical power. The second power regulator module 140 may then output the second regulated power signal 145 to at least one electrical device external to the power management integrated circuit.

The exemplary system 100 illustrated in FIG. 1 and discussed previously was presented to provide specific illustrations of generally broader aspects of the present invention. Accordingly, the scope of various aspects of the present invention should not be limited by characteristics of the exemplary system 100.

Figure 2:
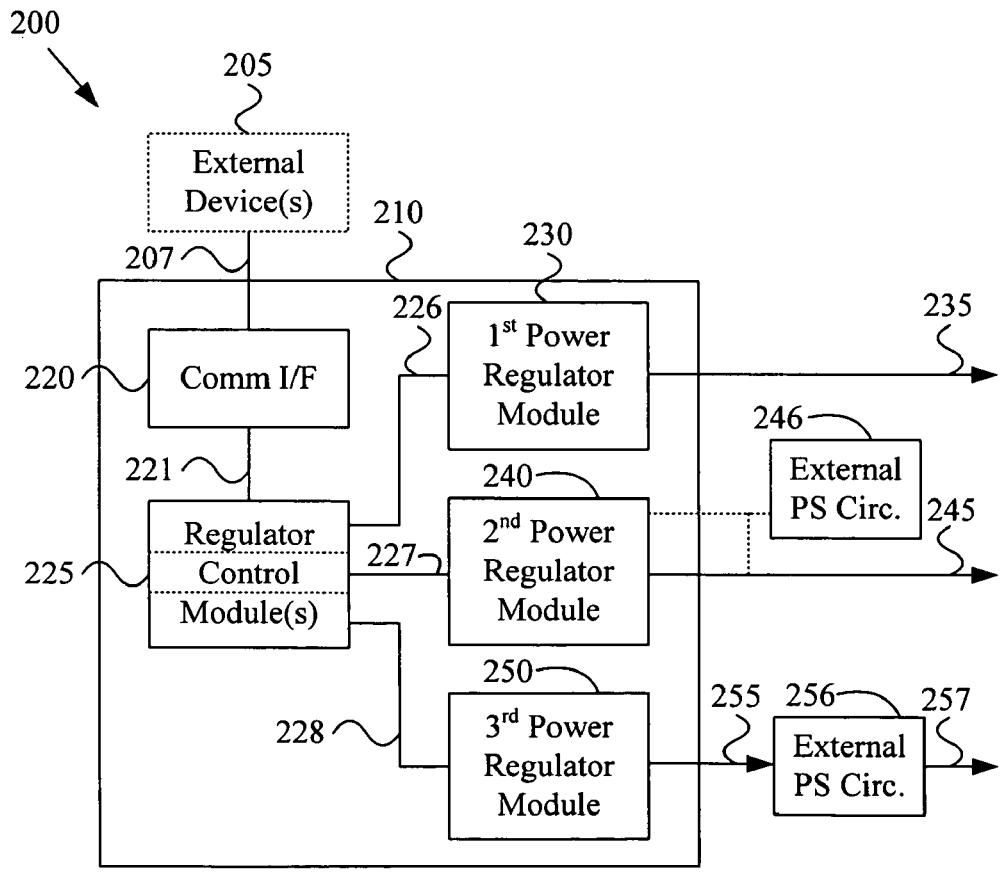
FIG. 2 shows a block diagram of a system comprising an exemplary power management integrated circuit utilizing received power supply information, in accordance with various aspects of the present invention.

FIG. 2 shows a block diagram of a system 200 comprising an exemplary power management integrated circuit 210 utilizing received power supply information, in accordance with various aspects of the present invention. The exemplary system 200 may, for example and without limitation, share various characteristics with the exemplary system 100 illustrated in FIG. 1 and discussed previously.

The exemplary power management integrated circuit 210 may comprise a communication interface module 220. The exemplary communication interface module 220 may, for example and without limitation, share various characteristics with the exemplary communication interface module 120 illustrated in FIG. 1 and discussed previously. For example, the communication interface module 220 may receive power supply information 207 from at least one electrical device 205 external to the integrated circuit 210. As discussed previously with regard to the exemplary system 100 illustrated in FIG. 1, the communication interface module 220 may also, for example, receive power supply information from at least one electrical device internal to the integrated circuit 210. Though such an internal electrical device is not illustrated in FIG. 2 and the following discussion will generally discuss an exemplary scenario including an electrical device external to the integrated circuit 210, the scope of various aspects of the present invention should by no means be limited by such externality Such power supply information may, for example, comprise information related to a first electrical power. Such power supply information may, for example, also comprise information related to a second electrical power and/or nth electrical power. The electrical device(s) 205 may also, for example and without limitation, share various characteristics with the exemplary electrical device(s) 105 illustrated in FIG. 1 and discussed previously.

The exemplary integrated circuit 210 may also comprise one or more regulator control modules 225 that process at least a portion 221 of the power supply information 207 received by the communication interface module 220 and generates regulator control signals 226-228. The regulator control module(s) 225 may, for example, generate the regulator control signals 226-228 based, at least in part, on at least a portion 221 of the power supply information 207.

In the exemplary system 100 illustrated in FIG. 1 and discussed previously, the individual power regulator modules 130, 140 processed at least a portion of the power supply information to determine and/or generate respective regulated power signals 135, 145. In the exemplary system 200 illustrated in FIG. 2, at least a portion of such processing is performed by the regulator control module(s) 225. For example, the one or more regulator control module(s) 225 may be at least partially integrated (e.g., in hardware and/or software), which may foster a more centralized approach for determining the plurality of regulator control signals 226-228 than the more distributed approach exemplified by the system 100 illustrated in FIG. 1.

The regulator control signals 226-228 may control various operational aspects of respective power regulator modules 230, 240, 250. The regulator control signals 226-228 may comprise characteristics of any of a variety of control signals. For example and without limitation, the regulator control signals 226-228 may comprise information of various power supply goals, which the respective power regulator modules 230, 240, 250 are to meet. For example, the regulator control signals 226-228 may comprise target voltage and/or current level information. Also for example, the regulator control signals 226-228 may comprise information of target power supply variability limits and/or noise limits. Further for example, the regulator control signals 226-228 may comprise information of load response goals that the power regulator modules 230, 240, 250 are to meet.

Also for example, the regulator control signals 226-228 may comprise information controlling various specific operational aspects of respective power regulator modules 230, 240, 250. For example, the regulator control signals 226-228 may comprise information for directly controlling switching behavior (e.g., duty cycle, switching frequency, etc.) in the respective power regulator modules 230, 240, 250. In general, the regulator control signals 226-228 may control various operational aspects of respective power regulator modules 230, 240, 250. Accordingly, the scope of various aspects of the present invention should not be limited by characteristics of particular regulator control signals and/or information.

As indicated previously, the exemplary integrated circuit 210 may comprise first, second and third power regulator modules 230, 240, 250. The power regulator modules 230, 240, 250 may, for example and without limitation, share various characteristics with the exemplary power regulator modules 130, 140 illustrated in FIG. 1 and discussed previously.

For example, the first regulator module 230 may receive the first regulator control signal 226 from the regulator control module(s) 225. The first power regulator module 230 may then, for example, determine a first regulated power signal 235 based at least in part on the first regulator control signal 226, where the first regulated power signal 235 corresponds to first electrical power (e.g., the first electrical power to which at least a portion of the received power supply information is related).

As mentioned previously, the first regulated power signal 235 may correspond to the first electrical power in any of a variety of manners. In the exemplary system 200 illustrated in FIG. 2, the first regulated power signal 235 comprises the first electrical power. The first power regulator module 230 might, for example, generate the first regulated power signal 235 (comprising the first electrical power) utilizing only circuitry internal to the integrated circuit 210.

The second power regulator module 240 may, for example, receive the second regulator control signal 227 from the regulator control module(s) 225. The second power regulator module 240 may then, for example, determine a second regulated power signal 245 based at least in part on the second regulator control signal 227, where the second regulated power signal 245 corresponds to second electrical power (e.g., second electrical power to which at least a portion of the received power supply information is related).

As mentioned previously, the second regulated power signal 245 may correspond to the second electrical power in any of a variety of manners. In the exemplary system 200 illustrated in FIG. 2, the second regulated power signal 245 comprises the second electrical power. The second power regulator module 240 may, for example, generate the second regulated power signal 245 (comprising the second electrical power) in conjunction with power supply circuitry 246 external to the integrated circuit 210. In a non-limiting exemplary scenario, such external power supply circuitry 246 may comprise various switching power supply circuitry (e.g., electrical components in a boost converter configuration).

The third power regulator module 250 may, for example, receive the third regulator control signal 228 from the regulator control module(s) 225. The third power regulator module 250 may then, for example, determine a third regulated power signal 255 based at least in part on the third regulator control signal 228, where the third regulated power signal 255 corresponds to third electrical power (e.g., third electrical power to which at least a portion of the received power supply information is related).

As mentioned previously, the third regulated power signal 255 may correspond to the third electrical power in any of a variety of manners. In the exemplary system 200 illustrated in FIG. 2, the third regulated power signal 255 comprises one or more signals or sub-signals that cause power supply circuitry 256 external to the integrated circuit 210 to output the third electrical power 257. In a non-limiting exemplary scenario, such external power supply circuitry 256 may comprise various switching power supply circuitry (e.g., electrical components in a buck converter configuration).

The exemplary system 200 illustrated in FIG. 2 and discussed previously was presented to provide specific illustrations of generally broader aspects of the present invention. Accordingly, the scope of various aspects of the present invention should not be limited by characteristics of the exemplary system 200.

FIG. 3 illustrates a flow diagram of a method 300 for providing regulated signal(s) corresponding to electrical power(s) from a power management integrated circuit utilizing received power supply information, in accordance with various aspects of the present invention. The exemplary method 300 may, for example and without limitation, share various characteristics with the functionality discussed previously with regard to the exemplary systems 100, 200 illustrated in FIGS. 1-2 and discussed previously.

The exemplary method 300 may begin at step 310. The method 300 (and other methods discussed herein) may begin for any of a variety of reasons. For example and without limitation, the method 300 may begin automatically in response to a power-up or reset condition. Also for example, the method 300 may begin in response to a command, either from a user or from a system component. Further for example, the method 300 may execute periodically or in response to a detected system or environmental condition. Accordingly, the scope of various aspects of the present invention should not be limited by characteristics of any particular initiating cause or condition.

The exemplary method 300 may, at step 320, comprise determining initial characteristics of first electrical power. Step 320 may comprise determining such characteristics in any of variety of manners. For example and without limitation, step 320 may comprise determining such initial characteristics by utilizing default characteristics or utilizing stored information of previous characteristics.

Step 320 may also, for example, comprise determining initial characteristics of a first regulated power signal that corresponds to first electrical power. Such correspondence was generally discussed previously in the discussion of FIG. 1. For example and without limitation, step 320 may comprise determining such initial characteristics by utilizing default characteristics or utilizing stored information of previous characteristics.

In general, step 320 may comprise determining initial characteristics of first electrical power and/or initial characteristics of a corresponding first regulated power signal. Accordingly, the scope of various aspects of the present invention should not be limited by a particular manner of determining initial characteristics of electrical power or corresponding signals.

The exemplary method 300 may, at step 330, comprise outputting the first regulated power signal (e.g., as determined at step 320 or step 350, to be discussed later) to at least one electrical device external (or internal) to the integrated circuit. Step 330 may, for example and without limitation, share various functional characteristics with the exemplary power regulator modules 130, 140, 230, 240, 250 discussed previously with regard to FIGS. 1-2. Though the following discussion generally refers to an electrical device external to the integrated circuit, the scope of various aspects of the present invention should by no means be limited by such externality. For example and without limitation, the electrical device may, in accordance with various aspects of the present invention, be internal to the integrated circuit.

For example, step 330 may comprise outputting the first regulated power signal to power supply circuitry external to the integrated circuit. Such power supply circuitry may, for example, provide the first electrical power to at least one electrical device (e.g., an electrical device that might provide power supply information, as received at step 340, to be discussed later). Also for example, step 330 may comprise outputting the first regulated power signal directly to at least one electrical device (e.g., an electrical device that might provide power supply information, as received at step 340, to be discussed later).

In general, step 330 may comprise outputting the first regulated power signal to at least one electrical device external to the power management integrated circuit. Accordingly, the scope of various aspects of the present invention should not be limited by characteristics of a particular regulated power signal or particular electrical device(s) external to the integrated circuit.

The exemplary method 300 may, at step 340, comprise receiving power supply information from one or more electrical devices external to the power management integrated circuit. The power supply information may, for example, comprise information related to a first electrical power. Step 340 may, for example and without limitation, share various functional characteristics with the exemplary communication interface modules 120, 220 illustrated in FIGS. 1-2 and discussed previously.

For example, the power supply information may comprise information related to various characteristics of electrical power. Such characteristics may, for example and without limitation, comprise voltage and/or current level, voltage and/or current variability, noise, ripple, load response characteristics, energy efficiency level, etc. The power supply information may, for example, comprise analog and/or digital information.

Step 340 may, for example, comprise receiving the power supply information in any of a variety of manners. For example, step 340 may comprise receiving the power supply information over an analog or digital communication link. The communication link may, for example, be serial or parallel. The communication link may, for example, comprise a dedicated information bus or a shared information bus. Step 340 may, for example, comprise receiving the power supply information utilizing any of a large variety of communication media and/or communication protocols.

Step 340 may comprise receiving the power supply information from any of a variety of devices external to the power management integrated circuit. For example, step 340 may comprise receiving the power supply information from at least one electrical device that receives and utilizes the first electrical power (e.g., corresponding to the regulated power signal output at step 330). Also for example, step 340 may comprise receiving the power supply information from an electrical device monitoring operation of another device that receives and utilizes the first electrical power. Further for example, step 340 may comprise receiving the power supply information from an electrical device that is communicatively coupled to an electrical device that receives and utilizes the first electrical power. Still further for example, step 340 may comprise receiving the power supply information from an electrical device associated with the production of the first electrical power. Accordingly, the scope of various aspects of the present invention should not be limited by characteristics of a particular device that step 340 might receive power supply information from.

The exemplary method 300 may, at step 350, comprise determining a first regulated power signal based, at least in part, on a portion of the power supply information (e.g., as received at step 340). The first regulated power signal may, for example, correspond to the first electrical power. Step 350 may, for example and without limitation, share various functional characteristics with the power regulator modules 130, 140, 230, 240, 250 and the regulator control module 225 illustrated in FIGS. 1-2 and discussed previously.

For example, the first regulated power signal may comprise the first electrical power. In such a scenario, step 350 might comprise generating the first electrical power using only electrical components internal to the integrated circuit or utilizing electrical components (e.g., power supply circuitry) external to the integrated circuit. Also for example, the first regulated power signal may comprise a signal that interacts with power supply circuitry external to the integrated circuit, which in turn generates the first electrical power.

Step 350 might comprise utilizing any of a variety of power regulator circuitry. For example, step 350 might comprise utilizing circuitry comprising characteristics of at least a front-end portion (if not a whole portion) of a linear voltage regulator, a switching regulator (e.g., a buck converter, boost converter, buck-boost converter, charge pump, etc.), or other types of known or yet to be developed regulator circuits. Accordingly, the scope of various aspects of the present invention should not be limited by characteristics of particular type of circuitry that step 350 might utilize.

In an exemplary scenario where the first regulated power signal (e.g., as output by step 330) interacts with circuitry external to the integrated circuit to provide the first electrical power, such external circuitry may comprise electrical components in any of a variety of configurations. For example and without limitation, such electrical component configurations may comprise at least portions of a buck converter, boost converter, buck-boost converter, charge pump, or other types of known or yet to be developed power regulator circuits. Accordingly, the scope of various aspects of the present invention should not be limited by characteristics of particular power supply or power regulator circuitry architectures.

As mentioned previously, step 350 may comprise determining a first regulated power signal based at least in part on a portion of the power supply information, where the first regulated power signal corresponds to the first electrical power. Step 350 may comprise making such a determination in any of a variety of manners, depending on the particular operating scenario.

For example and without limitation, step 350 may comprise determining one or more characteristics of the first electrical power based, at least in part, on a portion of the power supply information. Step 350 may then, for example, comprise determining the first regulated power signal based on the determined characteristic(s).

In a non-limiting exemplary scenario, the power supply information (e.g., as received at step 340) may comprise information of a desired voltage level for the first electrical power. Step 350 may, for example, comprise determining the first regulated power signal based on such information. For example, step 350 may comprise directly outputting a first regulated power signal that comprises the first electrical power characterized by the desired voltage level (or other voltage level based on the desired voltage level). Also for example, step 350 may comprise outputting a first regulated power signal that, when interacting with circuitry external to the integrated circuit, causes the external circuitry to output the first electrical power characterized by the desired voltage level (or other voltage level based on the desired voltage level).

In another non-limiting exemplary scenario, the power supply information may comprise information of maximum desired voltage variability. Step 350 may, for example, comprise determining the first regulated power signal based on such information. For example, step 350 may comprise directly outputting a first regulated power signal that comprises the first electrical power characterized by the maximum desired voltage variability (or voltage variability based on the maximum desired voltage variability). Also for example, step 350 may comprise outputting a first regulated power signal that, when interacting with circuitry external to the integrated circuit, causes the external circuitry to output the first electrical power characterized by the maximum desired voltage variability (or voltage variability based on the maximum desired voltage variability).

In yet another non-limiting exemplary scenario, the power supply information may comprise information of a minimum energy-efficiency level. Step 350 may comprise determining the first regulated power signal based on such information.

For example, step 350 may comprise directly outputting a first regulated power signal that comprises the first electrical power characterized by the minimum energy-efficiency level (or energy-efficiency level based on the minimum energy-efficiency level). Also for example, step 350 may comprise outputting a first regulated power signal that, when interacting with circuitry external to the integrated circuit, causes the external circuitry to output the first electrical power characterized by the minimum energy-efficiency level (or energy-efficiency level based on the minimum energy-efficiency level).

In general, step 350 may comprise determining a first regulated power signal based at least in part on a portion of the power supply information, wherein the first regulated power signal corresponds to the first electrical power. Accordingly, the scope of various aspects of the present invention should not be limited by characteristics of any particular type of power supply information or a particular manner of determining a regulated power signal based on such information.

After step 350, the execution flow of the exemplary method 300 may flow back up to step 330, which may output the first regulated power signal as determined by step 350. Such flow is merely exemplary and should by no means limit the scope of various aspects of the present invention.

The previous discussion of the exemplary method 300 discussed determining and outputting a single first regulated power signal. A single regulated power signal was discussed for illustrative purposes only and should not limit the scope of various aspects of the present invention. For example, the method 300 is readily extensible to determining and outputting a plurality of regulated power signals, which may, for example, correspond to a plurality of respective electrical powers or may correspond to a common electrical power.

For example, the power supply information received at step 340 may comprise information related to a second electrical power. Step 350 may then, for example, comprise determining a second regulated power signal based at least in part on a portion of the power supply information, where the second regulated power signal corresponds to the second electrical power. The exemplary method 300 may similarly, for example, extend to receiving power supply information related to n electrical powers, and determining and outputting one or more regulated power signals corresponding to the n electrical powers. Accordingly, the scope of various aspects of the present invention should not be limited by the determination and generation of a single regulated power signal.

The exemplary method 300 illustrated in FIG. 3 and discussed previously was presented to provide specific illustrations of generally broader aspects of the present invention. Accordingly, the scope of various aspects of the present invention should not be limited by characteristics of the exemplary method 300.

FIG. 4 illustrates a flow diagram of a method 400 for providing regulated signal(s) corresponding to electrical power(s) from a power management integrated circuit utilizing power supply information received from a plurality of sources, in accordance with various aspects of the present invention. The method 400 may, for example and without limitation, share various functional characteristics with the exemplary systems 100, 200 illustrated in FIGS. 1-2 and discussed previously. The method 400 may also, for example and without limitation, share various characteristics with the exemplary method 300 illustrated in FIG. 3 and discussed previously.

As mentioned previously, various aspects of the present invention may receive and process power supply information from a plurality of sources. The exemplary method 400 provides a non-limiting exemplary illustration of such receipt and processing. The method 400, or various portions thereof, may for example, be executed in conjunction with the exemplary method 300 illustrated in FIG. 3. Alternatively for example, the method 400 may be executed independently. Accordingly, the scope of various aspects of the present invention should not be limited by characteristics of method independence or interrelationship with other methods.

The exemplary method 400 may, at step 420, comprise receiving power supply information from a first electrical device external (or internal) to the integrated circuit, where the power supply information comprises information related to a first electrical power. Similarly, the exemplary method 400 may, at step 430, comprise receiving power supply information from a second electrical device external to the integrated circuit, where the power supply information comprises information related to the first electrical power. Steps 420 and 430 may, for example and without limitation, share various characteristics with step 340 of the exemplary method 300 illustrated in FIG. 3 and discussed previously. Also, steps 420 and 430 may share various functional characteristics with the communication interface modules 120, 200 illustrated in FIGS. 1-2 and discussed previously. Note that though the present discussion will focus on receiving and processing power supply information from first and second external devices, the discussion is readily extensible to an n-device scenario and/or a scenario including one or more electrical devices internal to the integrated circuit.

The exemplary method 400 may, at step 440, comprise determining a first regulated power signal based at least in part on a portion of the power supply information, where the first regulated power signal corresponds to the first electrical power. Step 440 may, for example and without limitation, share various characteristics with step 350 of the exemplary method 300 illustrated in FIG. 3 and discussed previously.

For example, step 440 may comprise first processing the power supply information to determine one or more characteristics of the first electrical power. Step 440 may then, for example, output the first regulated power signal comprising the first electrical power having the determined characteristic(s). Alternatively for example, step 440 may determine characteristics of the first regulated power signal, which when output, will cause other circuitry to output the first electrical power having the determined characteristic(s).

As mentioned previously with regard to a portion of the functionality of the exemplary systems 100, 200, step 440 may comprise arbitrating between power supply needs of the first and second (or n) devices from which the power supply information was received. Such arbitration may, for example and without limitation, comprise determining characteristics of the first electrical power (and thus, the corresponding first regulated power signal) based, at least in part, on priority of the electrical devices. For example, step 440 may comprise determining characteristics of the first electrical power based solely on the electrical device with the highest priority. Alternatively for example, step 440 may comprise determining characteristics of the first electrical power based on a priority-based weighted average of power supply needs of the electrical devices. Further for example, step 440 may comprise determining characteristics of the first electrical power by averaging respective power supply needs of the electrical devices.

In general, exemplary step 440 may, in determining characteristics of the first electrical power and/or characteristics of the corresponding first regulated power signal, may arbitrate between needs of a plurality of electrical devices. Accordingly, the scope of various aspects of the present invention should not be limited by characteristics of any particular manner of performing such arbitration.

The exemplary method 400 may, at step 450, comprise outputting the first regulated power signal to at least one electrical device external to the integrated circuit. Step 450 may, for example and without limitation, share various characteristics with step 330 of the exemplary method 300 illustrated in FIG. 3 and discussed previously.

After performing step 450, execution flow of the exemplary method 400 may flow to step 460 for performing continued processing. Such continued processing may comprise any of variety of continued processing characteristics, including stopping, looping back to a previous method 400 step, entering a wait state, etc. Accordingly, the scope of various aspects of the present invention should not be limited by characteristics of any particular type of continued processing.

The previous discussion of the exemplary method 400 discussed determining and outputting a single first regulated power signal. A single regulated power signal was discussed for illustrative purposes only and should not limit the scope of various aspects of the present invention. For example, the method 400 is readily extensible to determining and outputting a plurality of regulated power signals, which may, for example, correspond to a plurality of respective electrical powers or may correspond to a common electrical power.

For example, the power supply information received at steps 420 and 430 may comprise information related to a second electrical power. Step 440 may then, for example, comprise determining a second regulated power signal based at least in part on a portion of the power supply information, where the second regulated power signal corresponds to the second electrical power. The exemplary method 400 may similarly, for example, extend to receiving power supply information related to n electrical powers, and determining and outputting one or more regulated power signals corresponding to the n electrical powers. Accordingly, the scope of various aspects of the present invention should not be limited by the determination and generation of a single regulated power signal.

The exemplary method 400 illustrated in FIG. 4 and discussed previously was presented to provide specific illustrations of generally broader aspects of the present invention. Accordingly, the scope of various aspects of the present invention should not be limited by characteristics of the exemplary system 400.

It should be stressed that various aspects of the present invention may be performed by hardware, a processor executing software instructions, or a combination thereof. Accordingly, the scope of various aspects of the present invention should not be limited by characteristics of any particular implementation.

In summary, various aspects of the present invention provide a system and method for providing power control in a power management integrated circuit. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A power management integrated circuit comprising:
   a communication interface module that operates to receive power supply information from at least one electrical device, where the power supply information comprises information related to a first electrical power and a second electrical power; and
   at least one power regulator module that operates to, at least:
      determine a first regulated power signal based at least in part on a portion of the power supply information, where the first regulated power signal corresponds to the first electrical power;
      output the first regulated power signal to at least one electrical device;
      determine a second regulated power signal based at least in part on a portion of the power supply information, where the second regulated power signal corresponds to the second electrical power; and
      output the second regulated power signal to at least one electrical device.

2. The integrated circuit of claim 1, wherein the at least one power regulator module operates to determine a first regulated power signal by determining one or more characteristic(s) of the first electrical power based at least in part on a portion of the power supply information, wherein the first regulated power signal corresponds to the first electrical power characterized by the determined characteristic(s).

3. The integrated circuit of claim 1, wherein the power supply information comprises information related to voltage level of the first electrical power.

4. The integrated circuit of claim 1, wherein the communication interface module comprises a digital signal interface, and the power supply information comprises digital information related to the first electrical power.

5. The integrated circuit of claim 1, where the at least one regulated power signal comprises the first electrical power.

6. The integrated circuit of claim 1, where the at least one regulated power signal comprises characteristics that cause power supply circuitry external to the integrated circuit to output the first electrical power.

7. The integrated circuit of claim 1, where the at least one electrical device to which the at least one power regulator module outputs the first regulated power signal comprises power supply circuitry.

8. The integrated circuit of claim 1, where the at least one electrical device to which the at least one power regulator module outputs the first regulated power signal comprises the at least one electrical device from which the communication interface module receives the power supply information.

9. The integrated circuit of claim 1, where the at least one electrical device from which the communication interface module receives the power supply information utilizes the first electrical power.

10. The integrated circuit of claim 1, wherein the power supply information comprises information related to both voltage level and voltage variability of the first electrical power.

11. A power management integrated circuit comprising:
    a communication interface module that operates to, at least, receive power supply information from a plurality of electrical devices external to the power management integrated circuit, wherein the power supply information comprises information related to a first electrical power; and a power regulator module that operates to, at least:
  determine, based at least in part on a portion of the received power supply information, a regulated power signal corresponding to the first electrical power by, at least in part, arbitrating between respective power supply needs of the plurality of electrical devices; and
  output the regulated power signal to at least one electrical device.

12. The integrated circuit of claim 1, wherein the communication interface module operates to receive power supply information from at least one electrical device external to the power management integrated circuit.

13. A power management integrated circuit comprising:
  a communication interface module that operates to receive power supply information from at least one electrical device external to the power management integrated circuit, where the power supply information comprises information related to a first electrical power and a second electrical power;
  a regulator control module that operates to process the received power supply information and generate a first regulator control signal and a second regulator control signal based, at least in part, on the received power supply information;
  a first power regulator module that operates to at least:
    determine a first regulated power signal based at least in part on the first regulator control signal, wherein the first regulated power signal corresponds to the first electrical power; and
    output the first regulated power signal to at least one electrical device external to the power management integrated circuit; and
  a second power regulator module that operates to, at least:
    determine a second regulated power signal based at least in part on the second regulator control signal, wherein the second regulated power signal corresponds to the second electrical power; and
    output the second regulated power signal to at least one electrical device external to the power management integrated circuit.

14. The integrated circuit of claim 13, wherein the regulator control module operates to generate the first regulator control signal by:
  determining one or more characteristics of the first electrical power based at least in part on a portion of the power supply information; and
  determining the first regulator control signal based, at least in part, on the determined characteristic(s) of the first electrical power;
  wherein the first regulated power signal output by the first power regulator module corresponds to the first electrical power characterized by the determined characteristic(s).

15. The integrated circuit of claim 13, where
  the power supply information comprises information related to both voltage level and voltage variability of the first electrical power.

16. The integrated circuit of claim 13, wherein the communication interface module operates to receive the information related to the first electrical power and the information related to the second electrical power through identical communication line(s).

17. The integrated circuit of claim 13, wherein the power supply information comprises information related to voltage of the first electrical power.

18. The integrated circuit of claim 13, wherein the communication interface module comprises a digital signal interface, and the power supply information comprises digital information related to the first electrical power.

19. In a power management integrated circuit, a method for controlling electrical power, the method comprising:
  receiving power supply information from at least one electrical device external to the integrated circuit, where the power supply information comprises information related to a first electrical power and a second electrical power;
  determining a first regulated power signal based at least in part on a portion of the power supply information, where the first regulated power signal corresponds to the first electrical power;
  determining a second regulated power signal based at least in part on a portion of the power supply information, where the second regulated power signal corresponds to the second electrical power; and
  outputting the first regulated power signal to at least one electrical device external to the integrated circuit and outputting the second regulated power signal to at least one electrical device external to the integrated circuit.

20. The method of claim 19, wherein determining a first regulated power signal comprises determining one or more characteristics of the first electrical power based at least in part on a portion of the power supply information, and wherein the first regulated power signal corresponds to the first electrical power characterized by the determined characteristic(s).

21. The method of claim 19, where the power supply information comprises information related to voltage level of the first electrical power.

22. The method of claim 19, wherein receiving power supply information comprises receiving digital power supply information related to the first electrical power.

23. The method of claim 19, where the regulated power signal comprises the first electrical power.

24. The method of claim 19, where the regulated power signal causes power supply circuitry external to the integrated circuit to output the first electrical power.

25. The method of claim 19, wherein outputting the first regulated power signal comprises outputting the first regulated power signal to power supply circuitry external to the integrated circuit.

26. The method of claim 19, wherein outputting the first regulated power signal comprises outputting the first regulated power signal to the at least one electrical device from which the power supply information was received.

27. The method of claim 19, wherein receiving power supply information comprises receiving power supply information from at least one electrical device that receives and utilizes the first electrical power.

28. The method of claim 19, where the power supply information comprises information related to both voltage level and voltage variability of the first electrical power.

29. In a power management integrated circuit, a method for controlling electrical power, the method comprising:
  receiving power supply information comprises receiving power supply information from a plurality of electrical devices external to the power management integrated circuit, where the power supply information comprises information related to a first electrical power; and
  determining, based at least in part on a portion of the power supply information, a regulated power signal corresponding to the first electrical power by, at least in part, arbitrating between respective power supply needs of the plurality of electrical devices; and outputting the regulated power signal to at least one electrical device external to the power management integrated circuit.

30. The integrated circuit of claim 1, where the power supply information comprises information of voltage variability.

31. The integrated circuit of claim 30, where the information of voltage variability comprises information of a voltage variability limit.

32. The integrated circuit of claim 1, where the power supply information comprises information identifying a source of the power supply information.

33. The integrated circuit of claim 1, where the power supply information comprises multiplexed digital information from a plurality of source devices.

34. The integrated circuit of claim 11, wherein the power regulator module operates to arbitrate between respective power supply needs of the plurality of electrical devices by determining the regulated power signal based on power supply information associated with only a highest priority electrical device of the plurality of electrical devices.

35. The integrated circuit of claim 11, wherein the power regulator module operates to arbitrate between respective power supply needs of the plurality of electrical devices based, at least in part, on an average of respective power supply needs of the plurality of electrical devices.

36. The integrated circuit of claim 11, wherein the power regulator module operates to arbitrate between respective power supply needs of the plurality of electrical devices based, at least in part, on respective priorities of the plurality of electrical devices.

37. The integrated circuit of claim 11, wherein the power regulator module operates to arbitrate between respective power supply needs of the plurality of electrical devices based, at least in part, on a priority-based weighted average of the respective power supply needs of the plurality of electrical devices.

38. The method of claim 19, where the power supply information comprises information of voltage variability.

39. The method of claim 38, where the information of voltage variability comprises information of a voltage variability limit.

40. The method of claim 19, where the power supply information comprises information identifying a source of the power supply information.

41. The method of claim 19, where the power supply information comprises multiplexed digital information from a plurality of source devices.

42. The method of claim 29, wherein arbitrating between respective power supply needs of the plurality of electrical devices comprises determining the regulated power signal based on power supply information associated with only a highest priority electrical device of the plurality of electrical devices.

43. The method of claim 29, wherein arbitrating between respective power supply needs of the plurality of electrical devices comprises determining the regulated power signal based, at least in part, on an average of respective power supply needs of the plurality of electrical devices.

44. The method of claim 29, wherein arbitrating between respective power supply needs of the plurality of electrical devices comprises determining the regulated power signal based, at least in part, on respective priorities of the plurality of electrical devices.

45. The method of claim 29, wherein arbitrating between respective power supply needs of the plurality of electrical devices comprises determining the regulated power signal based, at least in part, on a priority-based weighted average of the respective power supply needs of the plurality of electrical devices.

* * * * *